(12) United States Patent
Jan et al.

(10) Patent No.: US 11,715,842 B2
(45) Date of Patent: *Aug. 1, 2023

(54) BUS BAR FOR BATTERY PACKS

(71) Applicant: ATIEVA, INC., Newark, CA (US)

(72) Inventors: James Jan, Newark, CA (US); Richard J. Biskup, Newark, CA (US); Benson Tsai, Newark, CA (US); Peter Rawlinson, Newark, CA (US)

(*) Notice: Subject to any disclaimer, the term of this patent is extended or adjusted under 35 U.S.C. 154(b) by 423 days.

This patent is subject to a terminal disclaimer.

(21) Appl. No.: 16/859,854

(22) Filed: Apr. 27, 2020

(65) Prior Publication Data

US 2020/0259154 A1 Aug. 13, 2020

Related U.S. Application Data

(60) Division of application No. 14/538,644, filed on Nov. 11, 2014, now Pat. No. 10,637,110, which is a
(Continued)

(51) Int. Cl.
*H01M 50/507* (2021.01)
*H01M 10/04* (2006.01)
(Continued)

(52) U.S. Cl.
CPC ....... *H01M 10/04* (2013.01); *H01M 10/6567* (2015.04); *H01M 50/507* (2021.01); *H01M 10/0422* (2013.01); *H01M 10/123* (2013.01); *H01M 10/283* (2013.01); *H01M 10/613* (2015.04); *H01M 10/625* (2015.04); *H01M 10/643* (2015.04); *H01M 10/6551* (2015.04); *H01M 10/6561* (2015.04); *H01M 50/213* (2021.01); *H01M 50/271* (2021.01); *H01M 50/516* (2021.01); *H01M 50/522* (2021.01);
(Continued)

(58) Field of Classification Search
None
See application file for complete search history.

(56) References Cited

U.S. PATENT DOCUMENTS

2009/0220850 A1† 9/2009 Bitsche
2012/0141852 A1† 6/2012 Eberhard
2012/0164490 A1† 6/2012 Takasaki

FOREIGN PATENT DOCUMENTS

JP 2011049014 A * 3/2011

OTHER PUBLICATIONS

Machine translation of JP-2011049014-A.*

\* cited by examiner
† cited by third party

*Primary Examiner* — Haixia Zhang
(74) *Attorney, Agent, or Firm* — The Brickell IP Group, PLLC; Javier Sobrado

(57) ABSTRACT

A battery pack has bus bars at one end, freeing the other end of the battery pack for cooling or other arrangements. A plurality of battery cells oriented in the same manner in the battery pack has first terminals of the battery cells at first ends of the battery cells. Portions of second terminals of the battery cells are at the first ends of the battery cells. The first ends of the battery cells are in a coplanar arrangement. A plurality of bus bars is assembled proximate to the first ends of the battery cells. The bus bars are coupled to the first terminals and the second terminals of the battery cells at the first ends of the battery cells to place the battery cells in a series connection and a parallel connection.

8 Claims, 13 Drawing Sheets

Related U.S. Application Data continuation of application No. 13/794,535, filed on Mar. 11, 2013, now Pat. No. 9,966,584.

(51) Int. Cl.
*H01M 10/6567* (2014.01)
*H01M 10/625* (2014.01)
*H01M 10/6551* (2014.01)
*H01M 10/643* (2014.01)
*H01M 10/6561* (2014.01)
*H01M 10/613* (2014.01)
*H01M 10/12* (2006.01)
*H01M 10/28* (2006.01)
*H01M 50/213* (2021.01)
*H01M 50/271* (2021.01)
*H01M 50/516* (2021.01)
*H01M 50/522* (2021.01)

(52) U.S. Cl.
CPC .... *H01M 2220/20* (2013.01); *Y10T 29/49108* (2015.01)

BUS BAR FOR BATTERY PACKS

BACKGROUND

A bus bar is a metal strip or bar that conducts electricity and is used for electrical power distribution. Battery cells can be connected with bus bars to make battery packs. Some battery packs using cylindrical cells make electrical connections to the tops and the bottoms of the cells with groups of battery cells having alternating orientations. When connecting cells in series, bus bars and high current interconnects link the positive terminal of one cell, or a parallel group of cells, to the negative terminal of the next cell or the next parallel group of cells. This configuration, illustrated in FIG. 1, obstructs airflow or liquid flow from cooling mechanisms utilized to remove heat generated by the cells, as well as obstructing the space for the cooling mechanisms themselves. FIG. 1 illustrates a schematic diagram of a battery pack 100 with a first group of battery cells 102, 104 in a parallel connection, a second group of battery cells 106, 108 in a parallel connection, and a third group of battery cells 110, 112 in a parallel connection. The first group, the second group and the third group are coupled in a series connection. Bus bars 114, 116, 118, 120 are used to connect the battery cells in this parallel and series coupling. Each of the bus bars is coupled to the respective battery cells with one or more wires, or local soldering or welding. Bus bar 120 couples the negative terminals of the first group of battery cells 102, 104 and is in the electrical direction of the negative terminal for the battery pack 100. Bus bar 114 couples the positive terminals of the first group of battery cells 102, 104 in parallel, and couples the negative terminals of the second group of battery cells 106, 108 in parallel. Bus bar 114 couples the first group of battery cells 102, 104 in series with the second group of battery cells 106, 108. Continuing with the couplings, bus bar 116 couples the positive terminals of the second group of battery cells 106, 108 in parallel, and couples the negative terminals of the third group of battery cells 110, 112 in parallel. Bus bar 116 also couples the second group of battery cells 106, 108 in series with the third group of battery cells 110, 112. Bus bar 118 couples the positive terminals of the third group of battery cells 110, 112 in parallel, and is in the electrical direction of the positive terminal for the battery pack 100. Some of the bus bars 114, 118 are above the battery cells 102, 104, 106, 108, 110, 112, and some of the bus bars 120, 116 are below the battery cells 102, 104, 106, 108, 110, 112. As mentioned above, this creates difficulties for cooling, in that the bus bars 114, 116, 118, 120 may block cooling air flow or may block efforts to install cooling mechanisms. One possibility for cooling is to install a coolant tube in gap 122 between cells 102, 104 in a group of battery cells, as well as other gaps 124 between the cells. For example, a coolant tube may extend in a serpentine fashion between the gaps 122, 124, and so on, of the cells. Such an arrangement can be made with non-uniform spacing between the battery cells 102, 104, 106, 108, 110, 112, such that the battery cells 102 in each pair of battery cells 102 is closely adjacent or touching, but pairs of battery cells 102, 104; 104, 106 are more widely separated by the spacing 122, 124. This spacing configuration consumes a relatively large volume of space.

It is within this context that the embodiments arise.

SUMMARY

One embodiment of a battery pack has a plurality of battery cells and a plurality of bus bars. The battery cells have first terminals of the battery cells at first ends of the battery cells. The battery cells have portions of second terminals of the battery cells at the first ends of the battery cells. The first ends of the battery cells are in a coplanar arrangement. The plurality of bus bars is disposed proximate to the first ends of the battery cells. The plurality of bus bars is coupled to the first terminals and the portions of the second terminals of the battery cells at the first ends of the battery cells to place the battery cells in a series connection and a parallel connection.

Another embodiment of a battery pack has a cell holder, a plurality of bus bars and a plurality of battery cells. The plurality of bus bars is positioned at a first end of the cell holder. A plurality of battery cells in a same orientation and arranged in the cell holder with each battery cell of the plurality of battery cells having a first terminal proximate to the plurality of bus bars and a portion of a second terminal proximate to the plurality of bus bars is included. The first terminal and the portion of the second terminal are electrically coupled to the plurality of bus bars at a first end of the battery cell such that the plurality of battery cells is in a parallel and series connection.

A method of assembling a battery pack is provided. The method includes arranging a plurality of battery cells so that first ends of the plurality of battery cells are coplanar to a first plane and opposed second ends of the plurality of battery cells are coplanar to a second plane. Each battery cell of the plurality of battery cells has a first terminal at the first end of the battery cell and a portion of a second terminal of opposite polarity at the first end of the battery cell. The method includes arranging a plurality of bus bars adjacent to the first ends of the plurality of battery cells. Coupling the plurality of bus bars to the first terminals and the second terminals of the battery cells is included in the method. The coupling is at the first ends of the battery cells thereby leaving the opposing end available for heat removal. The spacing of the battery cells is substantially uniform throughout the battery pack. The battery cells may be coupled in a series connection and a parallel connection.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Detailed illustrative embodiments of a battery pack where the bus bars are located proximate to one end of the battery terminals to leave the opposing end accessible to a heat sink are provided herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
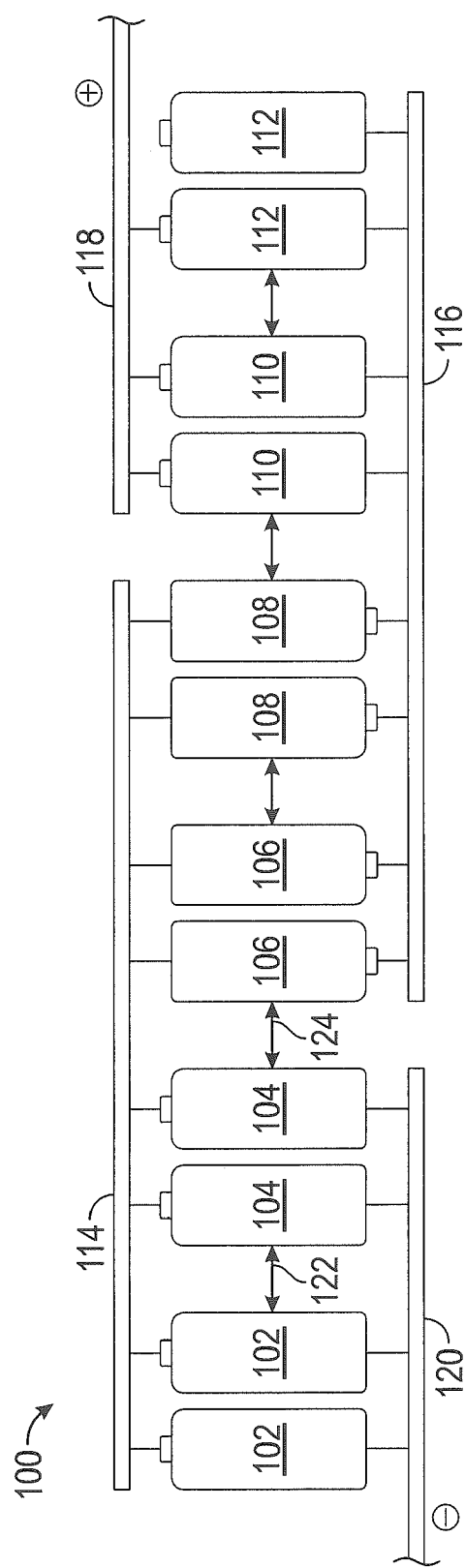
FIG. 1 is a schematic diagram of a battery pack with bus bars above and below the battery cells.

One type of battery pack, as shown in schematic form in FIG. 1, uses bus bars above and below the battery cells to connect the battery cells in a parallel, series or series-parallel manner, which limits the ability to remove heat generated by the cells of the battery pack and inefficiently utilizes space. By contrast, embodiments of the battery pack of FIG. 2A and 4-7 have bus bars at one end of the battery cells or the cell holder, with the battery cells oriented similarly, in various arrangements as will be further discussed below. The battery packs described herein may be used with lithium-ion battery cells or other types of rechargeable battery cells, and may be used in electric vehicles, hybrid vehicles and other applications. Electric vehicles and hybrid vehicles include land based motor vehicles as well as air based vehicles and water based vehicles. It should be appreciated that the embodiments may also be integrated with non-rechargeable battery cells.

Figure 2A:
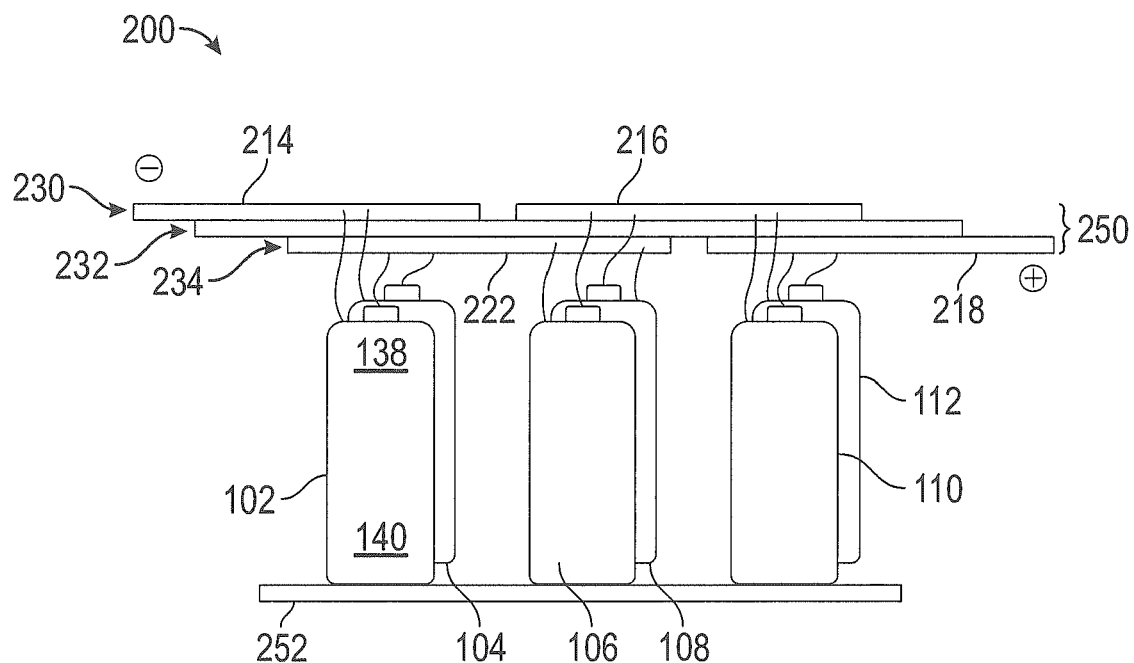
FIG. 2A is a schematic diagram of a battery pack with bus bars adjacent to the positive terminals of the battery cells, in accordance with some embodiments.

FIG. 2A shows a battery pack 200 with a bus bar arrangement enabling efficient heat removal from one end of the battery pack as all the bus bars are proximate to the other end of the battery pack. In this embodiment, the bus bars 214, 216, 222, 218 are assembled proximate to one end of the battery cells, enabling more efficient use of the space and enhanced cooling capabilities as explained in more detail below. The battery cells are all oriented with the positive terminal facing upwards, as opposed to the alternating orientation of groups of cells illustrated in FIG. 1. The battery pack 200 makes use of the access to both positive and negative terminals at one end of the cells, e.g., a top end of the cells, by coupling the bus bars to the positive and negative terminals through wires proximate to the top end of the cells. As shown in FIG. 2A, the first group of battery cells 102, 104 is in a parallel connection, the second group of battery cells 106, 108 is in a parallel connection, and the third group of battery cells 110, 112 is in a parallel connection. The first group, the second group and the third group are in a series connection with each other. Bus bars 214, 216, 218, 222 are used to couple the battery cells in this parallel and series coupling, as follows. Starting with the negative terminal of the battery pack 200, a first bus bar 214 is connected to the negative terminals of the first group of battery cells 102, 104 at a top end 138 of each of the battery cells. The second bus bar 222 is connected to the positive terminals of the first group of battery cells 102, 104 at the top end 138 of each of the battery cells. The first and second bus bars 214, 222 couple the first group of battery cells 102, 104 in parallel. The second bus bar 222 and the third bus bar 216 couple the second group of battery cells 106, 108 in parallel. The third bus bar 216 and the fourth bus bar 218 couple the third group of battery cells 110, 112 in parallel. Series connections are also formed by the bus bars. The second bus bar 222 connects the positive terminals of the first group of battery cells 102, 104 to the negative terminals of the second group of battery cells 106, 108. The third bus bar 216 connects the positive terminals of the second group of battery cells 106, 108 to the negative terminals of the third group of battery cells 110, 112. The fourth bus bar 218 is the positive terminal of the battery pack 200. Other arrangements of bus bars and parallel connections, serial connections, or parallel and series connections are readily devised as variations. Battery cells of other polarities may be used in these variations. It should be appreciated that the connections between the battery cells and the bus bars may be made through wires extending through apertures defined through the layer stack as described below with reference to FIG. 2B in some embodiments.

The bus bars can be arranged in a layer stack 250 of FIG. 2A, or in other arrangements, such as the finger configurations of FIGS. 7A-F, as will be later discussed. In the layer stack 250, the first bus bar 214 and the third bus bar 216 are placed in a first layer 230, and are separated by a gap so as not to short-circuit. The gap may be filled with an insulator material in some embodiments, however this is optional. An insulator is disposed as the second layer 232. The second bus bar 222 and the fourth bus bar 218 are placed in a third layer 234, and are separated by a gap or insulator so as not to short-circuit. The third layer 234 is separated from the first layer 230 by the second layer 232, namely the insulator, so that the bus bars on differing layers do not short-circuit. It should be appreciated that alternate configurations of the layer stack are possible as FIG. 2A is one example and not meant to be limiting. For example, the layer stack may have more than three layers and each bus bar layer may have a single bus bar or two or more bus bars disposed within a single co-planar layer.

Battery cells 102-112 have a projecting nub or protrusion as a positive terminal at the top end of the cell. Battery cells 102-112 have a can or casing as a negative terminal of the cell. The casing has a relatively flat surface at the bottom end of the cell, cylindrical sides, and a portion of the negative terminal at the top end of the cell. In some types of battery cells, the casing has a crimp at the top end of the cell, which is formed as the casing is sealed around the contents of the battery cell. This crimp or other portion of the negative terminal at the top end of the cell provides physical and electrical access at the top end to the negative terminal of the battery cell. The crimp is spaced apart from the peripheral sides of the projecting nub through a gap that may or may not be filled with an insulator. It should be appreciated that having bus bars at both ends, i.e., the top and the bottom, of the battery cells does not leave an area where a heat sink can be affixed to be in thermal communication with the top or bottom surfaces of the battery cells for efficient heat removal.

In some embodiments, the layer stack is formed using layers of a circuit board. For example, the bus bars can be made of (or on) copper layers or another suitable conductive metal and the insulator can be made of resin impregnated fiberglass or other suitable insulator materials. In variations, the bus bars can be made of aluminum or other conductive metals, and various materials may be applied as an insulator. In some embodiments, a heat sink 252 is assembled to the bottom ends 140 of the battery cells 102, 104, 106, 108, 110, 112 and is thermally coupled to the bottom ends 140. The heat sink may have finning or passages for air or liquid cooling. A fan may supply air flow across a surface of the heat sink 252 in some embodiments. Liquid cooling systems may be utilized in some embodiments. In a variation, the heat sink is attached or affixed to the bottom of a battery cell holder, such as the battery cell holder of FIG. 3. The co-planar arrangement of the battery cells provides a relatively flat surface to attach a heat sink and in some embodiments the battery cells are designed to cool efficiently through the bottom of the cells, e.g., 18650 Lithium ion batteries.

Figure 2B:
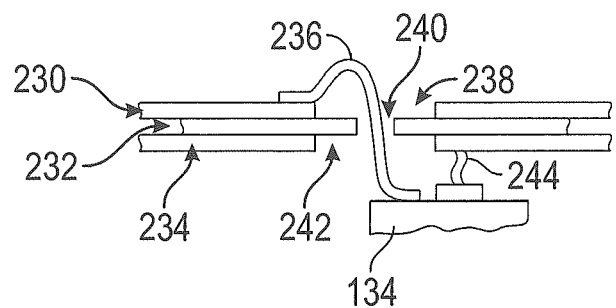
FIG. 2B is a cross-section view of bus bars in a layer stack, in an embodiment of the battery pack of FIG. 2A.

One technique for routing wires connecting the bus bars to the battery cell terminals is shown in FIG. 2B. In FIG. 2B, each of the materials in the layer stack has an aperture, and the sizes of the apertures are arranged so that a bond wire 236 or other wire is less likely to short out to one of the bus bars. In the example shown, a bus bar on the first layer 230 of the layer stack has an aperture 238, through which the bond wire 236 can pass. An insulator on the second layer 232 of the layer stack has a smaller aperture 240, through which the bond wire 236 can pass. A bus bar on the third layer 234 of the layer stack has a larger aperture 242, through which the bond wire 236 can pass. The smaller aperture 240 of the insulator, i.e., the second layer 232, constrains motion of the bond wire 236 so that the bond wire 236 is less likely to contact edges of the larger aperture 242 or aperture 238. In other words, the bond wire 236 is less likely to contact the bus bar on the third layer 234 or the first layer 230 as a result of the staggered sizes of the apertures. Bond wire 236 couples the bus bar on the first layer 230 to a surface 134 of a battery cell, e.g., a positive nub terminal or a negative terminal at the top of the battery cell. A further bond wire 244 couples the bus bar on the third layer 234 to the other of the battery terminals, at the top of the battery cell. In the example shown in FIG. 2B, the bond wire 236 couples to the negative terminal at the top of the battery cell, and the bond wire 244 couples to the positive terminal (the nub, button or nipple) at the top of the battery cell. The apertures 242 of the lower bus bar, closer to the first ends or tops of the battery cells, are larger than the apertures 240 of the insulator. In some embodiments the apertures are circular and the diameter of aperture 240 is less than the diameter of the apertures 238, 242 through the bus bars above and below the insulator layer 232. In addition, it should be appreciated that the apertures of one layer are aligned with apertures of another layer so that access is provided through the layer stack. It should be further appreciated that the apertures may be any geometric configuration and are not limited to circular shapes. Other arrangements of apertures are readily devised, for example to accommodate wires bonded or attached to another surface of a bus bar or attached in another manner. The embodiments of the stacked bus bars may be encased within a housing or enclosure for use in a particular application, such as a hybrid or electric vehicle.

Figure 3:
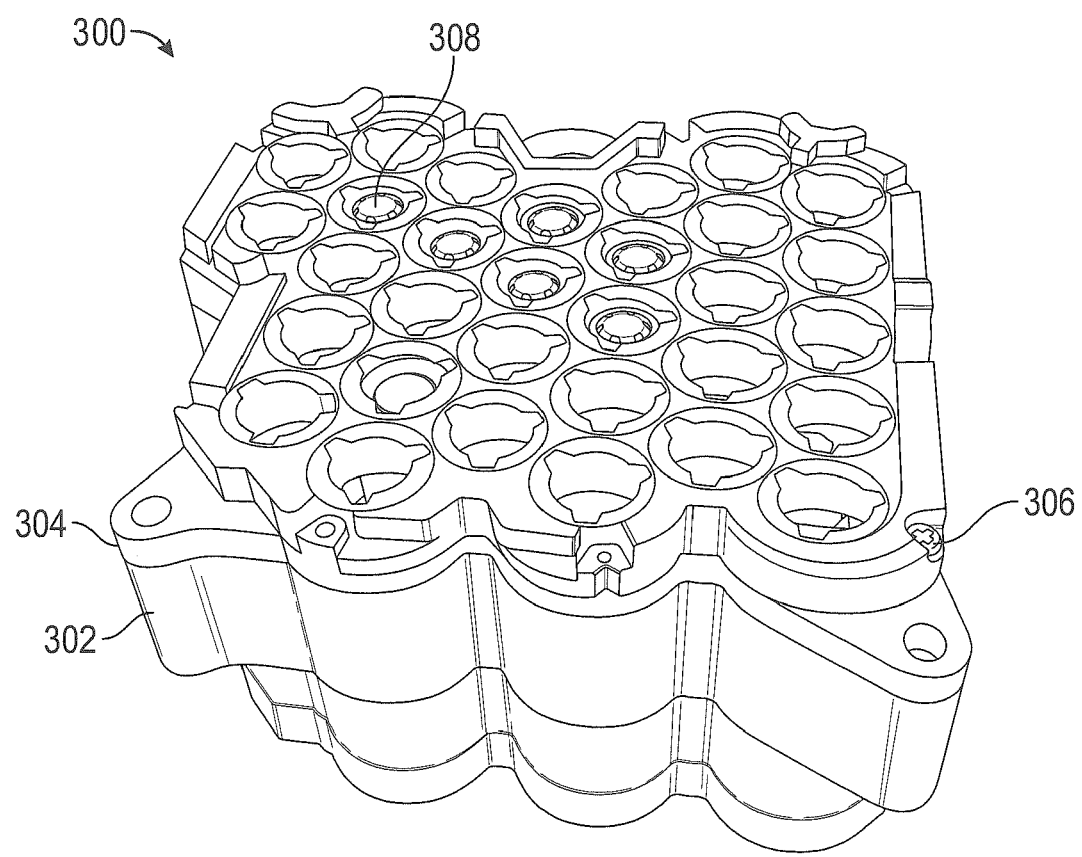
FIG. 3 is a perspective view of a cell holder in accordance with some embodiments.

FIG. 3 shows a battery cell holder 300. In the embodiment shown, the battery cell holder 300 is made of a plastic material. Variations of the battery cell holder 300 may be made of other materials, and may be molded, cast or even produced using a 3-D printer. Battery cells 308 are inserted into a housing 302, and a lid 304 is attached to the housing 302, for example by one or more fasteners 306 or other means. The battery cell holder 300 retains the battery cells in a close-pack or dense-pack, staggered row or hexagonal arrangement. Other arrangements are readily devised as the embodiments are not limited to the hexagonal arrangement. As shown, the battery cell holder 300 is only partially populated, and can readily be filled with battery cells. These can be commercially available battery cells, such as lithium ion cells or cells of another chargeable or non-chargeable technology. In other embodiments, the battery cells may be proprietary battery cells made especially for a specific battery pack. The battery cell holder 300 is shown without the bus bars, which are readily added as shown in FIGS. 4-7F.

Figure 4:
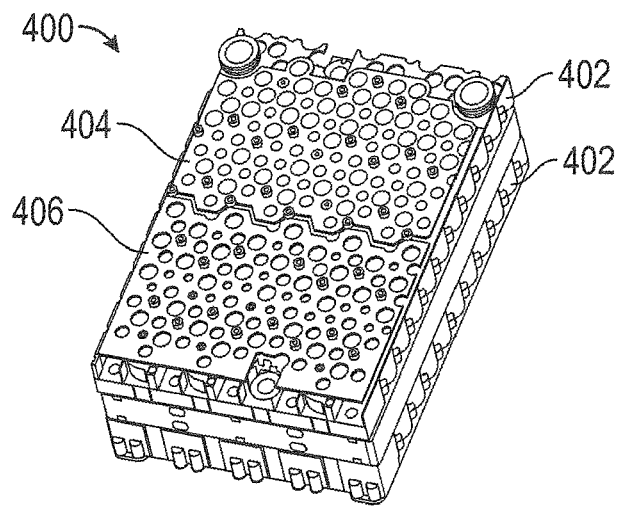
FIG. 4 is a perspective view of a battery pack with a bus bar layer at one end of the battery pack, in accordance with some embodiments.

FIG. 4 shows a battery pack 400, such as the battery cell holder FIG. 3 or a variation thereof fully populated with battery cells. At one end of the housing 402, for example the top end of the housing 402, a bus bar layer is added. The bus bar layer has a first bus bar 404 and a second bus bar 406. The first bus bar 404 couples a first group of battery cells to a second group of battery cells in series, and the second bus bar 406 connects a third group of battery cells to a fourth group of battery cells in series. A gap separates the first bus bar 404 and the second bus bar 406 (similar to the arrangement shown in FIG. 2A) so that these bus bars do not short. The first bus bar 404 and the second bus bar 406 extend over an entirety of the top surface of the housing 402 in this embodiment. The first bus bar 404 and the second bus bar 406 have apertures through which bond wires or other wires can pass to form electrical connections with the battery cells and corresponding bus bar.

Figure 5:
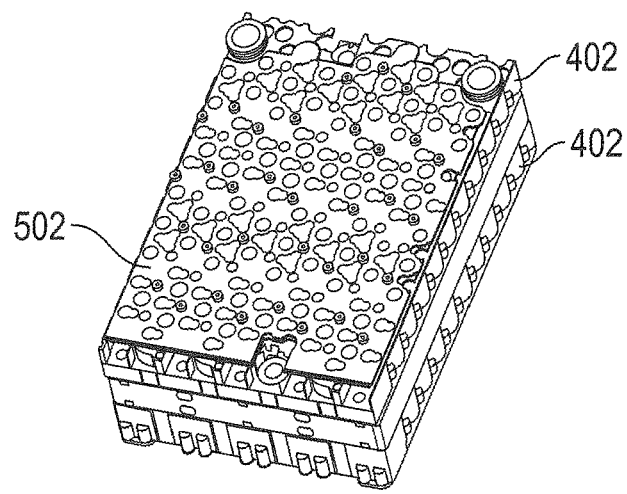
FIG. 5 is a perspective view of the battery pack of FIG. 4 with an insulator layer on top of the bus bar layer in accordance with some embodiments.
Figure 6:
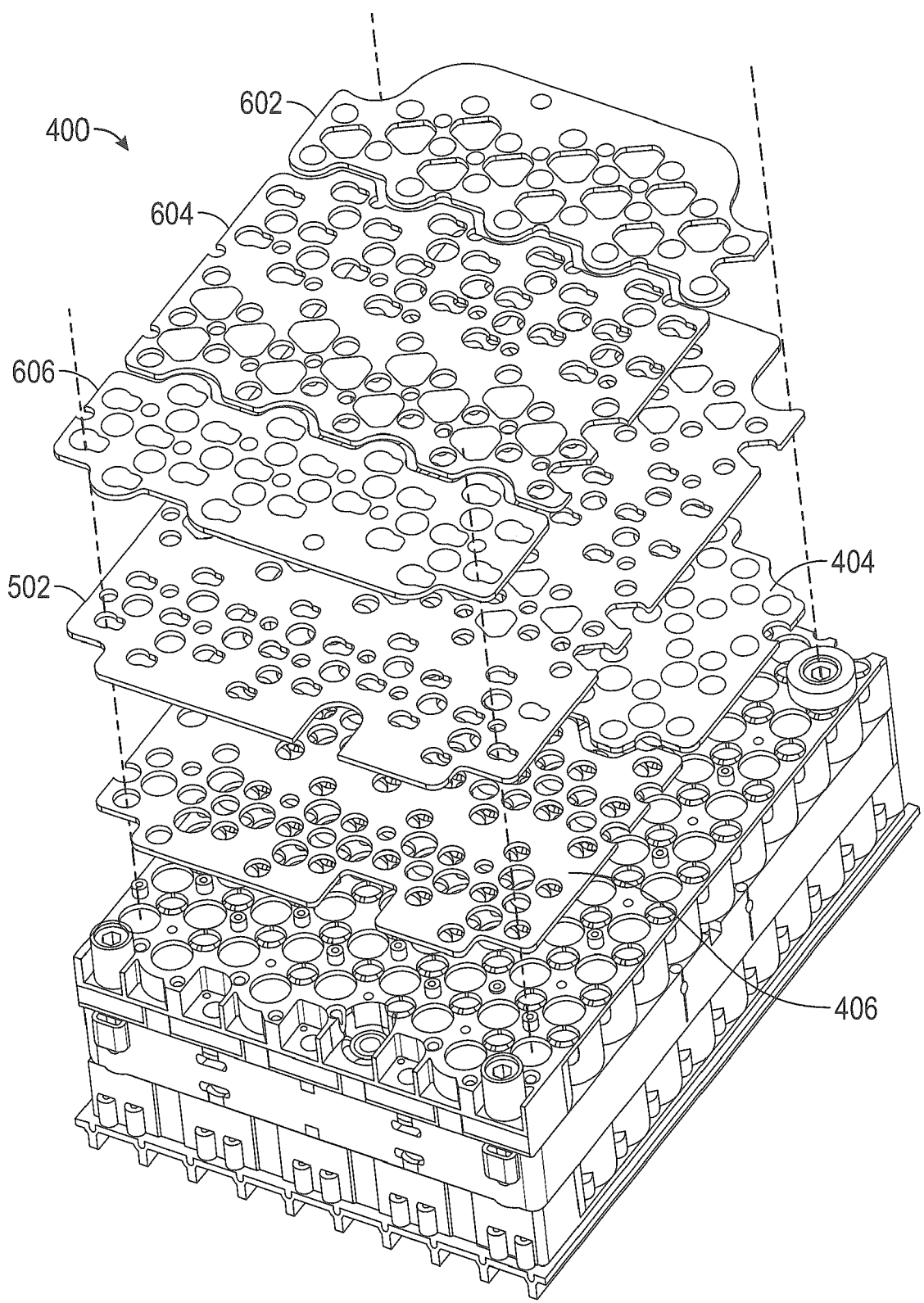
FIG. 6 is an exploded view illustrating the layers of FIG. 4 and FIG. 5 with an additional bus bar layer on top of the insulator layer in accordance with some embodiments.

FIG. 5 shows the battery pack 400, with an insulator layer 502 added on top of the bus bar layer. The insulator layer 502 covers the top surface of first bus bar 404 and the second bus bar 406 of FIG. 4, and may have apertures through which bond wires or other wires can pass to form electrical connections with the battery cells. As illustrated, the apertures of the insulator layer 502 are aligned with corresponding apertures of the bus bar layer of FIG. 4. FIG. 6 is an exploded view illustrating the layers of FIG. 4 and FIG. 5 with an additional bus bar layer on top of the insulator layer 502. In FIG. 6 the battery pack 400 includes a third bus bar 602, a fourth bus bar 604, and a fifth bus bar 606, all of which are coplanar in this embodiment. The third bus bar 602 connects the first group of battery cells to another block or group of battery cells, e.g., in a neighboring battery pack. The fourth bus bar 604 connects the second group of battery cells to the third group of battery cells. The fifth bus bar 606 connects the fourth group of battery cells to another block or group of battery cells, e.g., in a second neighboring battery pack. Bus bars 602-604 include apertures defined through the surface and these apertures are aligned with the apertures of the insulator layer of FIG. 5 and the apertures of the first bus bar layer of FIG. 6. Thus, with the corresponding apertures of each layer substantially aligned, access is provided for wires or leads from the battery cells to each bus bar layer as illustrated with reference to FIG. 2B. In addition, coplanar bus bars 602, 604, and 606 are separated by a gap which may or may not be filled with an insulator material.

Referring to FIGS. 4-6, the first group of battery cells is connected in parallel by the first bus bar 404 and the third bus bar 602. The second group of battery cells is connected in parallel by the first bus bar 404 and the fourth bus bar 604. The third group of battery cells is connected in parallel by the fourth bus bar 604 and the second bus bar 406. The fourth group of battery cells is connected in parallel by the fifth bus bar 606 and the second bus bar 406. Other groupings of parallel and series connections can be formed by other arrangements and connections of bus bars as readily devised in variations. In addition, more stacks of bus bars and insulator layer may be integrated into the embodiments discussed herein.

Figure 7A:
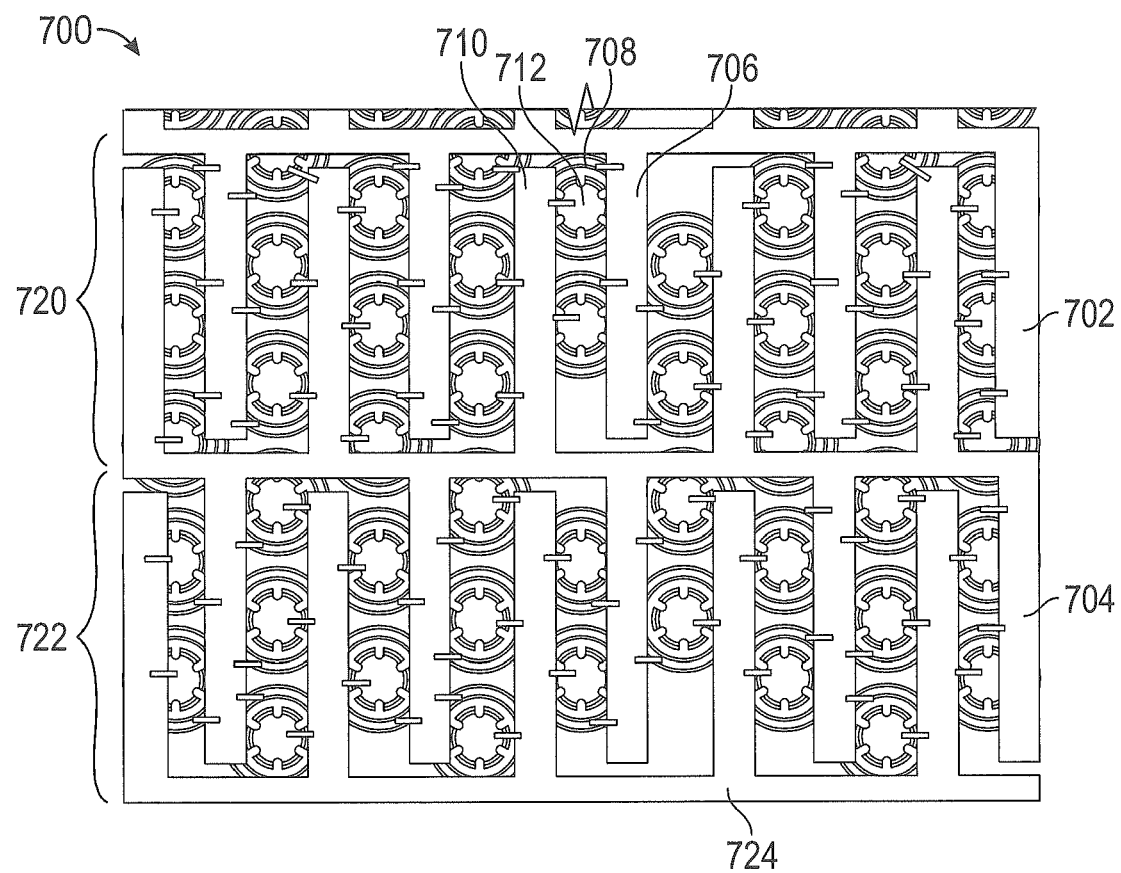
FIG. 7A is a top view of bus bars with interleaved fingers in accordance with some embodiments.

FIG. 7A illustrates an alternative technique for arranging bus bars at a single end of a battery pack, i.e., at one end of each of the battery cells. Two bus bars 702, 704 are in coplanar arrangement, and have interleaved fingers 706, 710, in an interleaved bus bar arrangement 700. That is, the fingers 706 of a first bus bar 702 are laterally interleaved and co-planar with the fingers 710 of a second bus bar 704. The fingers 706 of the first bus bar are coupled to the negative terminals 708 of a first group 720 of the battery cells. The fingers 710 of the second bus bar 704 are coupled to the positive terminals 712 of the first group 720 of the battery cells. In this example, the coupling from the bus bars to the positive and negative terminals of the battery cells is via bond wires attached at the top ends of the battery cells. Local welding, soldering or other electrical connection techniques could also be applied. The first bus bar 702 and the second bus bar 704 connect the first group 720 of the battery cells in parallel. Additional fingers of the second bus bar 704 are connected to the negative terminals of a second group 722 of battery cells. Fingers of a third bus bar 724 are connected to the positive terminals of the second group 722 of battery cells. The second bus bar 704 and the third bus bar 724 connect the second group 722 of the battery cells in parallel. Thus, the second bus bar 704 connects the first group 720 and the second group 722 of battery cells in series. Additional groups of battery cells can be connected in series by additional bus bars with interleaved fingers, in related arrangements.

Figure 7B:
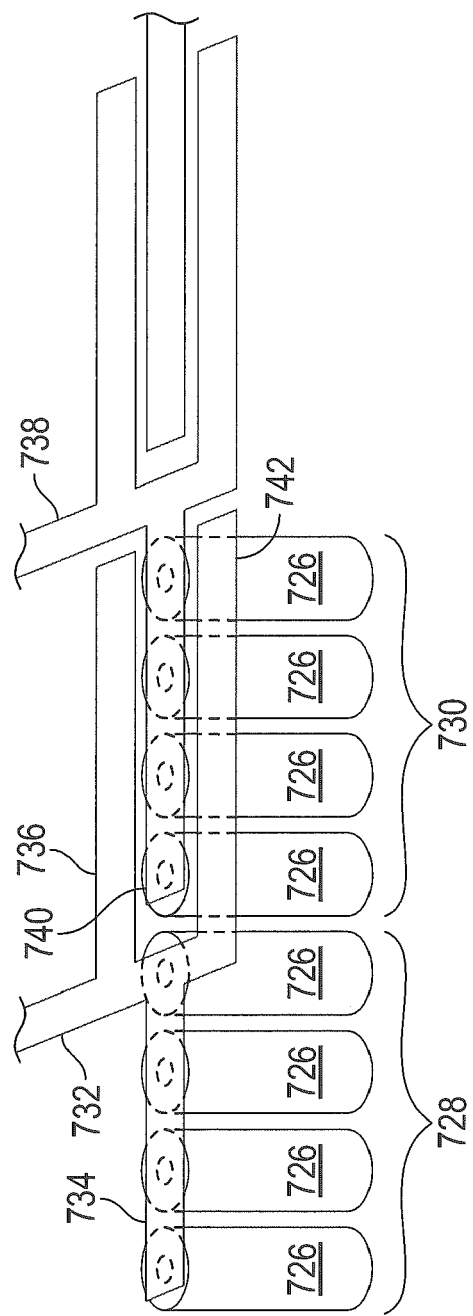
FIG. 7B is a perspective view of an embodiment of bus bars with fingers interleaved in a lateral direction in accordance with some embodiments.

FIG. 7B is a schematic diagram of an embodiment of bus bars 732, 738 with fingers 736, 740 interleaved in a lateral direction. The battery cells 726 in the battery pack are all in the same orientation, with first ends coplanar to a first plane and second ends coplanar to a second plane. Further battery cells 726 could be added, in lateral columns or lateral rows aligned with the battery cells 726 shown in FIG. 7B. Alternatively, the battery cells 726 could be added in lateral hexagonal close packed, also known as honeycomb, arrangement. For clarity, only one row of battery cells 726 is shown in this example. The lateral direction, in which the fingers 736, 740 of opposed bus bars 732, 738 are interleaved, is parallel to the planes defined by the ends of the battery cells 726. Finger 734 of a first bus bar 732 is shown attached to the positive or button terminals of the first group 728 of battery cells 726. Adjacent fingers of the bus bar 732 could couple to further positive or button terminals of further battery cells 726 in the first group 728 of battery cells, for a larger total of battery cells in parallel. Finger 736 of the first bus bar 732 is shown coupled to the negative terminals of the battery cells 726 in the second group 730 of battery cells 726, at the same ends of the battery cells 726 as the positive or button terminals. This couples the second group 730 of battery cells 726 in parallel with each other, and in series with the first group 728 of battery cells 726. Finger 740 of the second bus bar 738 couples to the positive or button terminals of the second group 730 of battery cells 726. This structure can be repeated for further parallel couplings of cells in a group of battery cells 726 and further series couplings of groups of battery cells 726. In the embodiment shown in FIG. 7B, the fingers 734, 736, 740 are of uniform width. Lateral spacing between adjacent fingers 736, 742 of a bus bar 732 is sufficient to accommodate a finger 740 of an opposed bus bar 738 without electrical shorting of the fingers 736, 740, 742. It should be appreciated that the bus bars depicted in FIGS. 7A-7E can be arranged for greater or lesser numbers of battery cells 726 in various battery cell arrangements of lateral rows, lateral columns or lateral hexagonal close packing as the examples are not meant to be limiting. The arrangements of battery cells 726 and bus bars depicted in FIGS. 7A-7E are thus modular and extensible in increments of a series-connected group of battery cells, with each group of battery cells 728, 730, 763 parallel connected within the group.

Figure 7C:
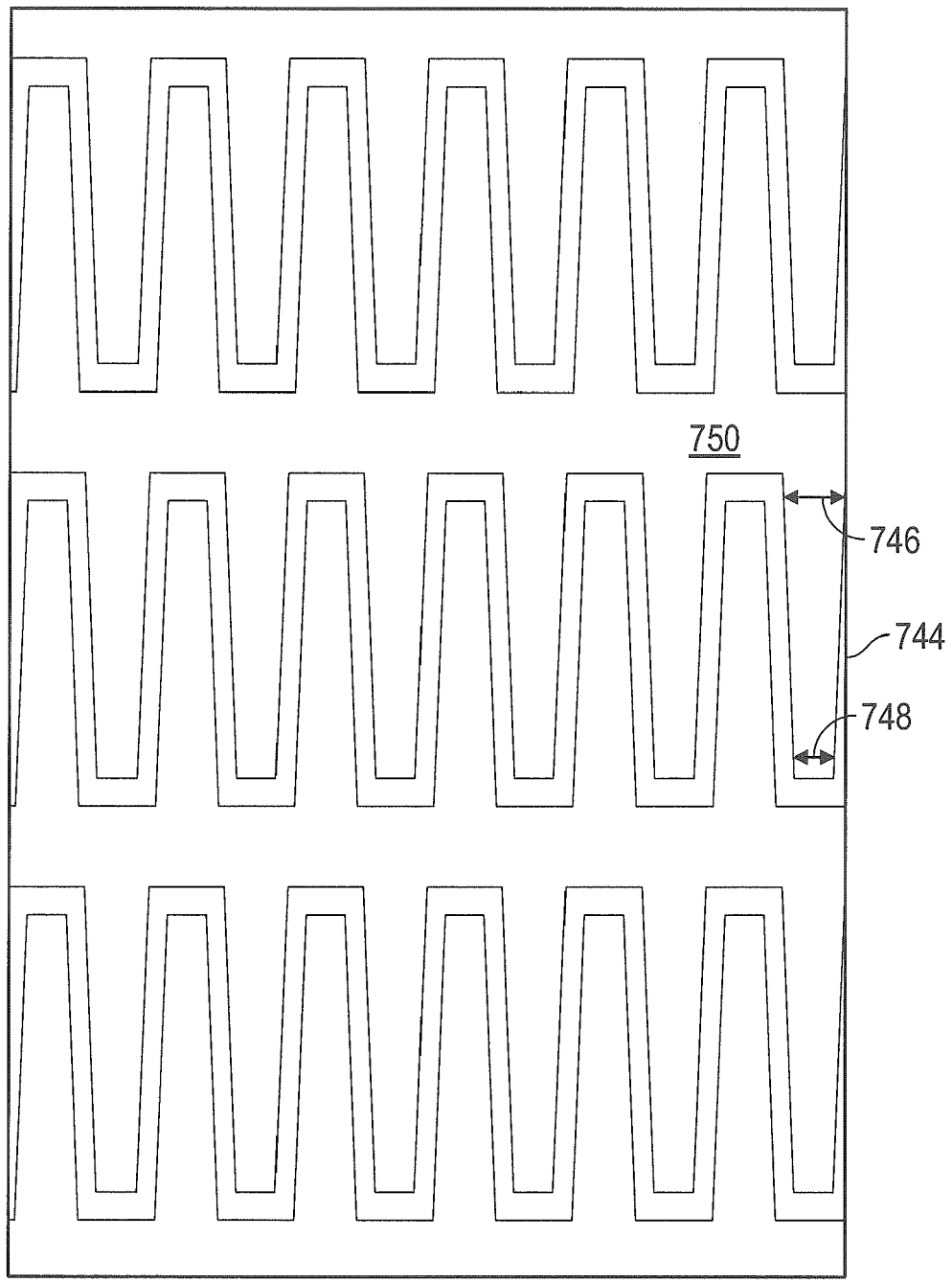
FIG. 7C is a top view of an embodiment of bus bars with shaped fingers in accordance with some embodiments.

FIG. 7C is a top view of an embodiment of bus bars 750 with fingers 744 having varying widths along a length of each finger. Each finger 744 has a width 746 at a base of the finger 744 that is wider than a width 748 at a tip of the finger 744 in this embodiment. The shape of fingers 744 may be referred to as trapezoidal. Electrical currents from the battery cells 726 connected in parallel by a finger 744 are additive along the length of the finger 744. At the base of the finger, the electrical current is equal to the sum of the electrical currents from all of the battery cells connected in parallel by the finger 744. This summed current sees a lower resistance as a result of the wider width 746 at the base of the finger 744, and thus has a lower voltage drop, than would be the case if the finger were a uniform width along the length of the finger. It should be appreciated that fingers 744 of one bus bar 750 having a wider uniform width necessitates having narrower opposed fingers 744 of an opposed bus bar 750 in a coplanar arrangement of bus bars 750. Resistance would then be varied along a length of fingers 744 of the bus bars 750. The shape of each finger 744 places the lower resistance at the base of each finger 744, where the lower resistance provides the best benefit in terms of reduced voltage drop.

Figure 7D:
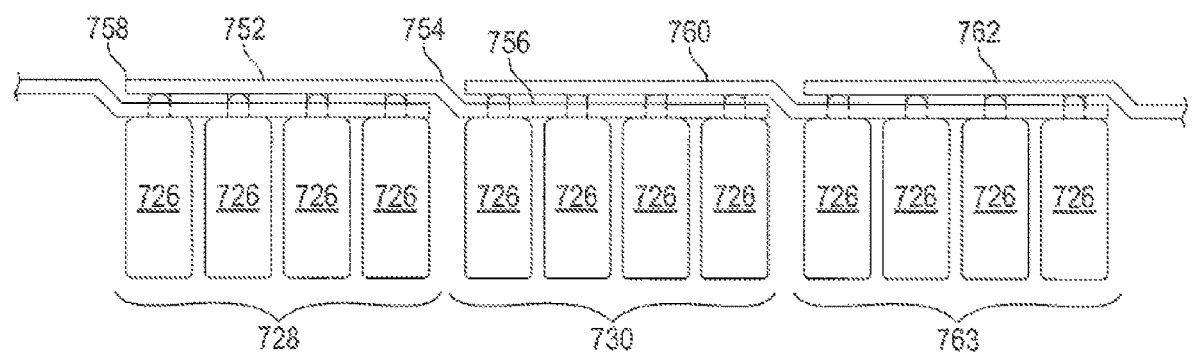
FIG. 7D is a side view of an embodiment of bus bars with bends in accordance with some embodiments.

FIG. 7D is a side view of an embodiment of bus bars 758, 760, 762 with Z bends 754. The Z bend 754 is seen in side view as changing the vertical elevation of one finger 752 relative to another finger 756 of the bus bar 758. Alternatively, the Z bend 754 changes the elevation of the fingers 752, 756, relative to the first ends of the battery cells 726. A first finger 752 contacts the positive or button terminals of the battery cells 726, at a greater or higher elevation relative to the battery cells 726 than the second finger 756. The second finger contacts the negative terminals of the battery cells 726, at the same end of the battery cells 726 as the positive or button terminals, and at a lower or lesser elevation relative to the battery cells 726 than the first finger 752. Fingers of opposing bus bars are thus spaced apart in a vertical direction defined by a longitudinal axis of each of the battery cell 726. Some embodiments of bus bars with Z bends have uniform finger width.

Figure 7E:
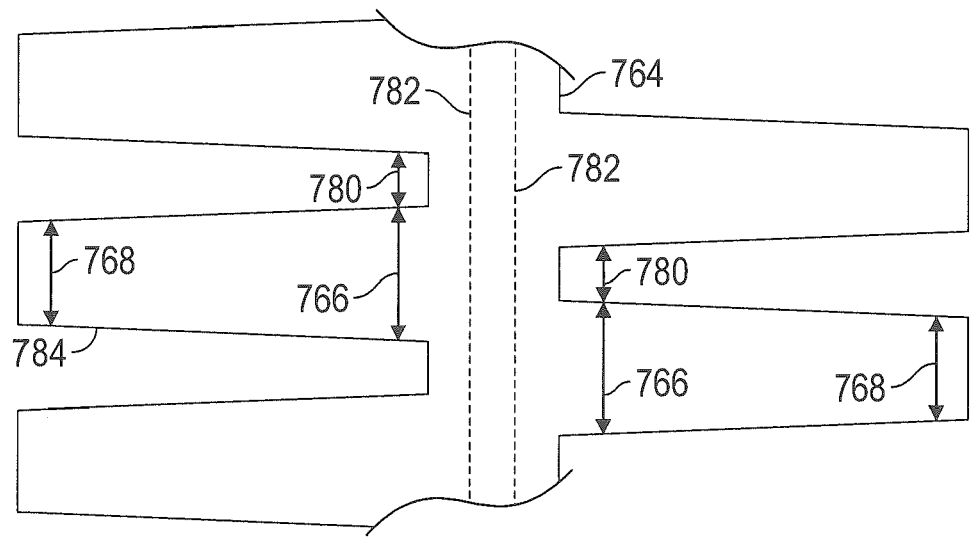
FIG. 7E is a top view of an embodiment of bus bars with bends and shaped fingers in accordance with some embodiments.

FIG. 7E is a top view of an embodiment of bus bars 764 with Z bends and shaped fingers 784. Each finger 784 has a greater width 766 at a base of the finger 784 than the width 768 at a tip of the finger 784. Fingers 784 may be referred to as having a trapezoidal shape in this embodiment. The space 780 between adjacent fingers 784 is less than the width 768 at the tip of the finger 784, and less than the width 766 at the base of the finger 784. Such a spacing and width arrangement of fingers 784 would not work successfully with a coplanar arrangement of bus bars, as opposed fingers of opposed bus bars would electrically short circuit. The Z bend can be accomplished by bending the bus bar 764 along the bend lines 782, or forming the bus bar 764 with bends along the bend lines 782. Bends of various angles can be employed, such as shallow, steep or vertical angles, or even obtuse angle bends resulting in acute angles between the midsection of the Z bend and either finger 784. Curves can also be employed, such as an S curve, which could still be called broadly a Z bend. The Z bend places the fingers 784 at higher and lower elevations, and is thus suitable for some embodiments as depicted in FIG. 7D. Assembly can be performed by depressing some of the fingers 784, and elevating others of the fingers 784, then attaching the fingers 784 to the battery cells 726 in the manner depicted in FIG. 7D.

Figure 7F:
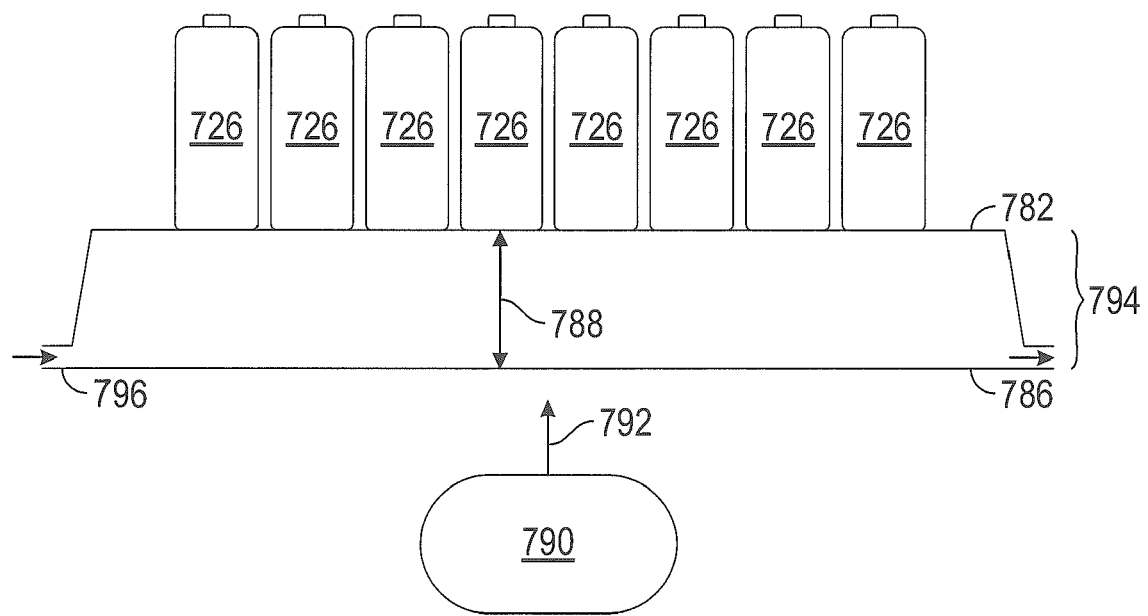
FIG. 7F is a side view depicting a cooling mechanism for the battery cells in accordance with some embodiments.

FIG. 7F is a side view depicting a cooling mechanism for the battery cells 726, in accordance with one embodiment. The cooling apparatus depicted in FIG. 7F could be a walled chamber, an enclosed liquid cooling chamber, a liquid-filled or liquid cooled heat sink, or other structure designed to provide cooling. In some embodiments, the cooling could be a forced air cooling mechanism. The cooling apparatus may include internal fins, baffles, passageways or other fixtures, and may include external fins, an external radiator, a heat exchanger or other device for removing or dissipating heat. In one embodiment, the liquid cooling apparatus has an inlet 796 and an outlet 786, and liquid can flow in through the inlet 796 and out through the outlet 786. The liquid cooling apparatus is attached to or otherwise thermally coupled to the second ends of the battery cells 726. The second ends of the battery cells are opposed to the first ends, which have the bus bars coupled thereto. Some, or perhaps many types of battery cells 726, especially those suitable for electric or hybrid vehicles, have greater thermal flow (i.e., lower thermal resistivity) through the bottoms of the battery cells 726 as compared to thermal flow through the sides of the battery cells 726. Placing the bus bars at one end of the battery cells 726 and the liquid cooling at the opposed end of the battery cells 726 supports a compact arrangement of battery cells 726 in which no liquid cooling circulates in the spaces between the battery cells 726. Battery cells 726 can be uniformly closely spaced or touching and densely packed, e.g., in hexagonal close packed arrangement, without the need for a serpentine cooling tube disposed between batteries.

A further benefit, in some embodiments, is that a height 788 of the cooling apparatus occupies, provides or is included in a crumple zone 794 (which may also be known as a crush space) relative to the battery cells 726. A large object 790 traveling in a direction 792 towards the battery cells 726 will first crush some or all of the cooling apparatus, prior to impacting the battery cells 726. In some instances, the crumple zone 794 may prevent such impacting the battery cells 726. The cooling apparatus in these embodiments provides a double benefit, that of efficiently cooling the battery cells 726, and that of absorbing kinetic energy of impact and thereby protecting the battery cells 726 from or during impact. In some embodiments, the battery cells 726 are arranged above the cooling apparatus, relative to gravity. Such an arrangement is suitable for installation into an electric or hybrid vehicle. Consequently, if an impact ruptures a liquid cooling apparatus, any liquid that leaks out will tend to be below the battery cells 726 and fall downward away from the battery cells 726, thereby decreasing the likelihood of electrically shorting the battery cells 726 as compared to other relative arrangements and orientations of battery cells 726 and a liquid cooling apparatus.

Figure 7G:
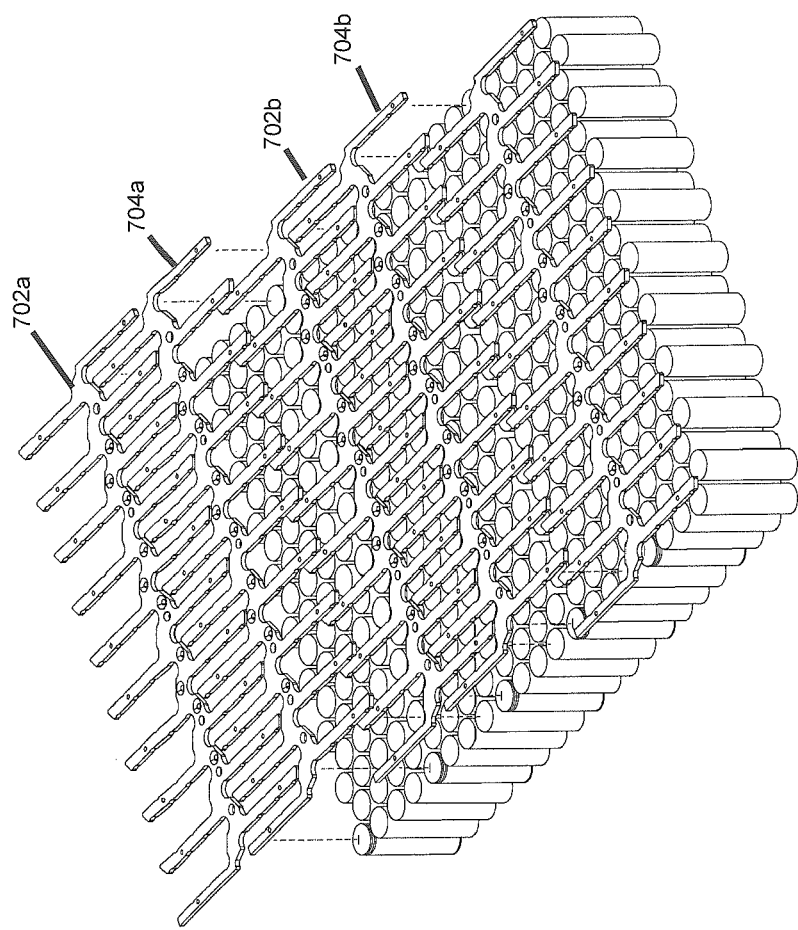
FIGS. 7G and 7H are schematic diagrams illustrating the bus bars with fingers in accordance with some embodiments.
Figure 7H:
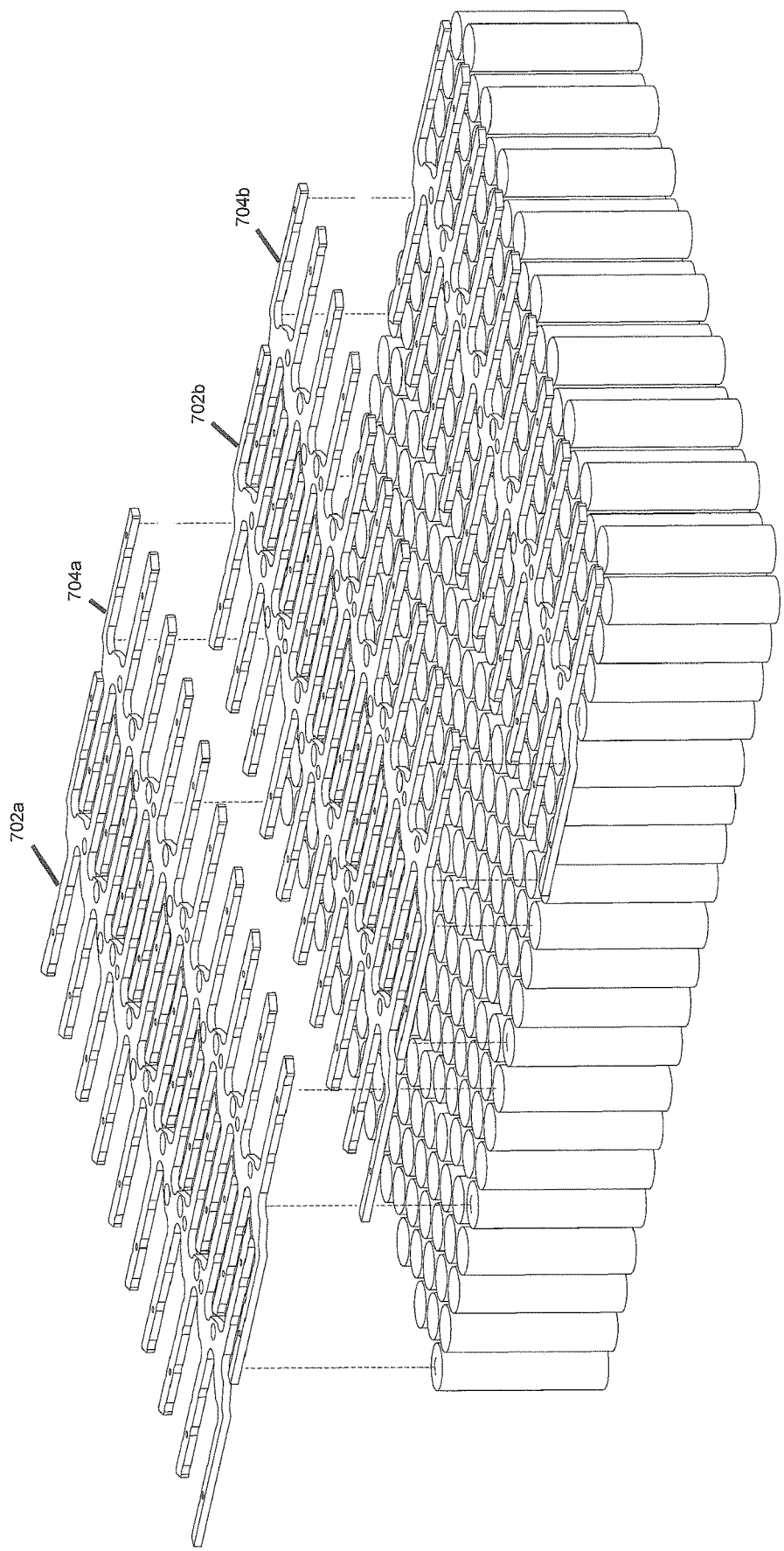

FIGS. 7G and 7H are schematic diagrams illustrating the bus bars with fingers in accordance with some embodiments. Bus bars 702a, 702b, 704a, and 704b illustrate one example configuration of the layout of the bus bars and the interleaved fingers over the surface of the batteries. The configuration of the bus bars in FIGS. 7G and 7H provide for rounded or shaped surfaces in contrast to the linear surfaces in FIG. 7A. It should be appreciated that numerous shaped surfaces/fingers for the bus bars are possible and the example embodiments described herein are meant to be illustrative and not limiting.

Figure 8:
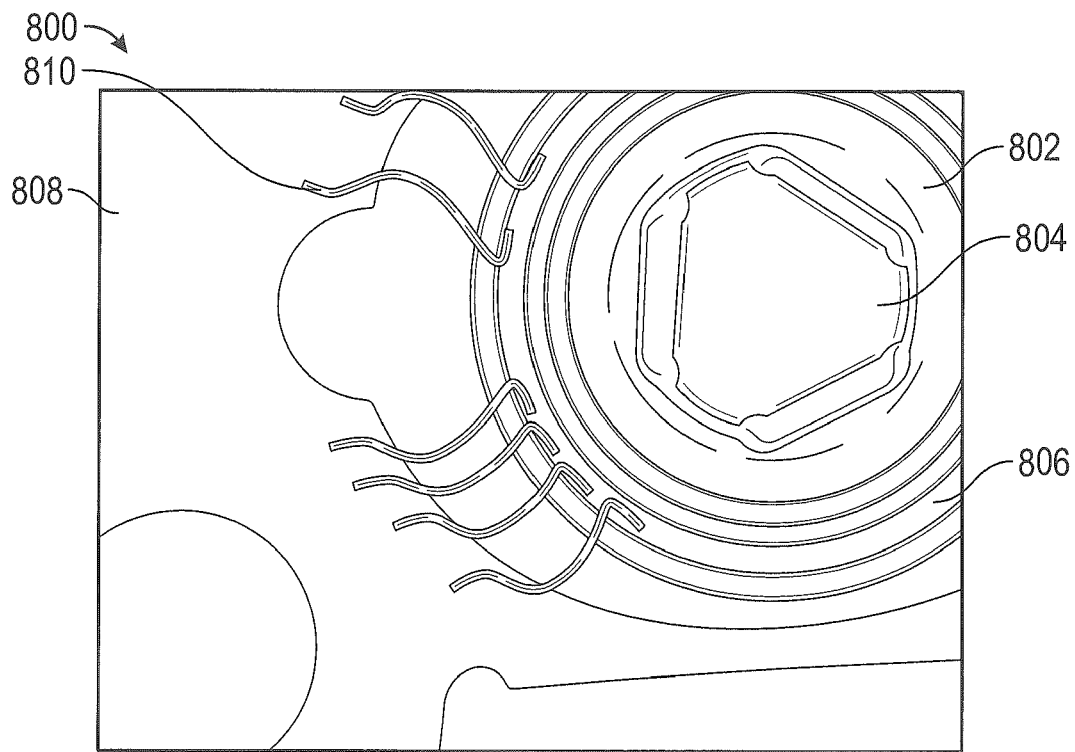
FIG. 8 is a schematic diagram illustrating bond wires coupling a bus bar to a terminal of a battery cell at one end of the battery cell in accordance with some embodiments.

FIG. 8 shows bond wires 810 coupling or electrically connecting a bus bar 808 to the negative terminal 806 of a battery cell 802, in a bus to cell wiring arrangement 800. The battery cell 802 has a nub 804 as a positive terminal, which will be later connected to another one of the bus bars. The bond wires 810 are, in one example, ultrasonically welded to the bus bar 808 at a proximate end of the bond wire, and ultrasonically welded to the negative terminal 806 of the battery cell at distal end of the bond wire. The bond wires may be aluminum, copper, silver or other conductive metals or combinations thereof. Other types of electrical connections between bus bars and battery terminals may be devised, such as spot welding, soldering, spring contacts, etc. It should be appreciated that the positive and negative electrical connections can be made utilizing the same machine or tool in these embodiments to further enhance manufacturing efficiencies.

Figure 9:
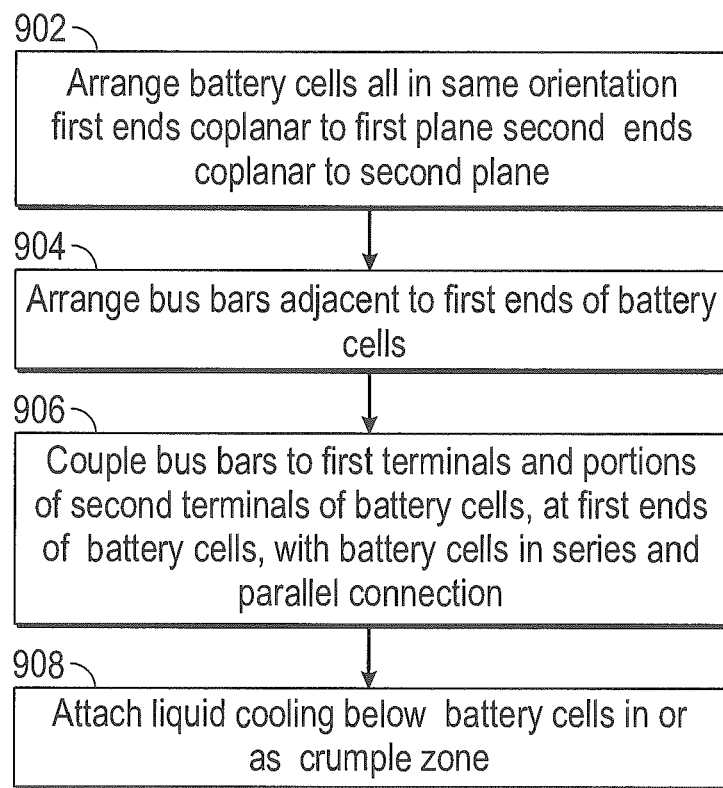
FIG. 9 is a flow diagram of a method for making a battery pack having the bus bars at a single end of the battery cells in accordance with some embodiments.

FIG. 9 shows a flow diagram of a method for assembling a battery pack. Variations of the method are readily devised, using fewer operations, additional operations, changing the order of the operations and so on. In an operation 902, battery cells are arranged with all of the battery cells in the same orientation. That is, all of the battery cells are facing the same way, e.g., with the positive terminals facing the same way and not in an alternating orientation as illustrated in FIG. 1. The first ends of the battery cells are coplanar to a first plane, and the second ends of the battery cells are coplanar to a second plane. For example, the battery cells could be placed into a cell holder or some suitable support structure for the battery cells, in lateral rows and/or columns, or in hexagonal close packed arrangement. In some embodiments the cell holder 300 and battery cells shown in FIG. 3 may be used. Bus bars are arranged adjacent to the first ends of the battery cells, in operation 904. The bus bars are arranged over the first ends of the battery cells for efficient heat removal from the opposing second ends of the battery cells. In operation 906, the bus bars are coupled to the first terminals and portions of the second terminals of the battery cells. This coupling is at the first ends of the battery cells and places the battery cells in series and parallel connection. For example, bus bar arrangements depicted in FIGS. 2A-7E or FIG. 8 could be utilized. Thus, all the bus bars are assembled along a single plane along the top of the cells in some embodiments to expose the area at the bottom of the cells so that this area can be utilized for thermal management. In addition, both the positive and negative electrical connection discussed below can be made from a single end of the assembly thereby enabling completion of the high current connections without having to reposition the bus bars.

The operations 902, 904, 906 result in at least a parallel-connected first group of battery cells and a parallel-connected second group of battery cells, with the first and second groups in series connection. Other arrangements of battery cells are provided by variations of the method. Further groups of parallel-connected battery cells can be coupled in series with the series-connected first and second groups of battery cells. Each group of parallel connected battery cells can have further parallel connected battery cells added. In an operation 908, in one embodiment, liquid cooling is attached below the battery cells. For example, a liquid cooling apparatus can be attached to the second ends of the battery cells or otherwise thermally coupled to the second ends of the battery cells. A suitable arrangement for this is depicted in FIG. 7F, and other arrangements and examples of liquid cooling, as well as forced air or passive cooling through a heat sink, can be devised. Duct work or plumbing for the liquid flow, a radiator or other heat dissipation device, mounting of a fan or a liquid pump, and electrical wiring for the fan or the liquid pump are readily devised for various embodiments.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A battery pack comprising:
   a cell holder;
   a plurality of bus bars positioned at a first end of the cell holder; and
   a plurality of battery cells in a same orientation and arranged in the cell holder with each battery cell of the plurality of battery cells having a first terminal proximate to the plurality of bus bars and a portion of a second terminal proximate to the plurality of bus bars, the first terminal and the portion of the second terminal electrically coupled to the plurality of bus bars at a first end of the battery cell such that the plurality of battery cells is in a parallel and series connection;
   wherein the plurality of bus bars includes a first bus bar having first fingers coupled to the first terminal of each of a first subset of the plurality of battery cells, and a second bus bar having second fingers coupled to the portion of the second terminal of each of the first subset of the plurality of battery cells, with the first fingers offset from the second fingers in a lateral direction, the lateral direction parallel to the plurality of bus bars.

2. The battery pack of claim 1, wherein the first fingers are interleaved with the second fingers.

3. The battery pack of claim 1, wherein the plurality of bus bars is modular and extensible in increments of one series-connected group of battery cells, with the group of battery cells parallel connected within the group by the plurality of bus bars so extended.

4. The battery pack of claim 1, wherein the first fingers offset from the second fingers in a vertical direction, the vertical direction perpendicular to the plurality of bus bars.

5. The battery pack of claim 1, wherein the:
   the first fingers are wider at a base of the first fingers than at a tip of the first fingers; and
   the second fingers are parallel to but non-coplanar with the first fingers, and the second fingers are wider at a base of the second fingers than at a tip of the second fingers.

6. The battery pack of claim 1, wherein
   the first bus bar further comprises additional fingers coupled to the portions of the second terminals of a second subset of the plurality of battery cells, which couples the second subset of the plurality of battery cells in series with the first subset of the plurality of battery cells.

7. The battery pack of claim 1, further comprising a liquid cooled heat sink attached to an opposed second end of the cell holder, at least a portion of the liquid cooled heat sink occupying a crumple zone relative to the battery pack.

8. The battery pack of claim 1, wherein fingers of opposing bus bars of the plurality of bus bars are spaced apart in a vertical direction or a lateral direction, the vertical direction perpendicular to the lateral direction and defined by a longitudinal axis of each of the plurality of battery cells.

* * * * *